(12) United States Patent
Hansson et al.

(10) Patent No.: US 9,890,706 B2
(45) Date of Patent: Feb. 13, 2018

(54) METHOD AND PLANT FOR TRANSFERRING ENERGY FROM BIOMASS RAW MATERIAL TO AT LEAST ONE ENERGY USER

(71) Applicant: Euroturbine AB, Finspång (SE)

(72) Inventors: Hans-Erik Hansson, Finspång (SE); Hans Levander, Kålmården (SE)

(73) Assignee: Phoenix BioPower AB, Stockholm (SE)

( * ) Notice: Subject to any disclaimer, the term of this patent is extended or adjusted under 35 U.S.C. 154(b) by 510 days.

(21) Appl. No.: 14/427,083

(22) PCT Filed: Dec. 27, 2013

(86) PCT No.: PCT/SE2013/051624
§ 371 (c)(1),
(2) Date: Mar. 10, 2015

(87) PCT Pub. No.: WO2014/104969
PCT Pub. Date: Jul. 3, 2014

(65) Prior Publication Data
US 2015/0240718 A1    Aug. 27, 2015

(30) Foreign Application Priority Data

Dec. 28, 2012  (SE) ..................... 1251518

(51) Int. Cl.
*F02C 3/28* (2006.01)
*C10J 3/62* (2006.01)
(Continued)

(52) U.S. Cl.
CPC ................. *F02C 3/28* (2013.01); *C10J 3/482* (2013.01); *C10J 3/62* (2013.01); *C10L 3/08* (2013.01);
(Continued)

(58) Field of Classification Search
CPC .................. F02C 3/28; C10J 2300/165; C10J 2300/1653; C10J 2300/1687
See application file for complete search history.

(56) References Cited

U.S. PATENT DOCUMENTS 4,150,953 A *  4/1979  Woodmansee ............. C10J 3/16
                                                                  261/16
5,266,086 A   11/1993  Bailey et al.
(Continued)

FOREIGN PATENT DOCUMENTS

EP    0 278 609 A2    8/1988
EP    2 213 848 A1    8/2010
(Continued)

*Primary Examiner* — Matthew J Merkling
(74) *Attorney, Agent, or Firm* — Blank Rome LLP (57) ABSTRACT

A method for producing energy including: producing fuel gases from biomass raw material in a main receptacle unit (8), feeding produced fuel gas to a consumer unit (2,3), transferring energy from the consumer unit to at least one energy user (7). The method includes recovering heat and producing pressurized superheated steam, intermittently loading biomass raw material into at least one vessel (8'), being included in the main receptacle unit (8), pressurizing the loaded at least one vessel (8') with pressurized superheated steam, passing pressurized superheated steam through the loaded and pressurized at least one vessel (8'), thereby contacting and heat treating said biomass raw material with the pressurized superheated steam for the production of said fuel gases, supplying produced fuel gases together with still superheated steam to the consumer unit (2,3). The invention also concerns a plant.

29 Claims, 10 Drawing Sheets

(51) Int. Cl.
    *F02C 3/04*         (2006.01)
    *F02C 3/30*         (2006.01)
    *F02C 6/00*         (2006.01)
    *F02C 7/22*         (2006.01)
    *C10L 3/08*         (2006.01)
    *C10L 5/44*         (2006.01)
    *C10J 3/48*         (2006.01)

(52) U.S. Cl.
    CPC ................ *C10L 5/44* (2013.01); *F02C 3/04* (2013.01); *F02C 3/30* (2013.01); *F02C 6/00* (2013.01); *F02C 7/22* (2013.01); *C10J 2300/092* (2013.01); *C10J 2300/0906* (2013.01); *C10J 2300/0909* (2013.01); *C10J 2300/0916* (2013.01); *C10J 2300/0956* (2013.01); *C10J 2300/165* (2013.01); *C10J 2300/1606* (2013.01); *C10J 2300/1675* (2013.01); *C10J 2300/1807* (2013.01); *C10J 2300/1884* (2013.01); *C10J 2300/1892* (2013.01); *Y02E 20/14* (2013.01); *Y02E 50/10* (2013.01); *Y02E 50/11* (2013.01); *Y02E 50/12* (2013.01); *Y02E 50/30* (2013.01); *Y02P 20/129* (2015.11)

(56) References Cited

U.S. PATENT DOCUMENTS

| | | | |
|---|---|---|---|
| H1325 H * | 7/1994 | Doering | 48/197 R |
| 5,507,141 A * | 4/1996 | Stigsson | D21C 11/12 |
| | | | 162/30.11 |
| 5,922,090 A | 7/1999 | Fujimura et al. | |
| 6,430,915 B1 | 8/2002 | Vviant et al. | |
| 7,300,642 B1 | 11/2007 | Pedersen et al. | |
| 2003/0106266 A1 | 6/2003 | Bryan et al. | |
| 2003/0136127 A1 | 7/2003 | Thiessen | |
| 2004/0079087 A1* | 4/2004 | Chandran | C10J 3/482 |
| | | | 60/781 |
| 2007/0012045 A1 | 1/2007 | Chandran et al. | |
| 2008/0141672 A1 | 6/2008 | Shah et al. | |
| 2009/0173005 A1 | 7/2009 | Neumann | |
| 2010/0223839 A1* | 9/2010 | Garcia-Perez | C01B 3/34 |
| | | | 44/313 |
| 2012/0308441 A1 | 12/2012 | Hansen | |

FOREIGN PATENT DOCUMENTS

| | | |
|---|---|---|
| JP | 2004-51258 A | 2/2004 |
| WO | WO 00/58242 A2 | 10/2000 |
| WO | WO-01/68789 A1 | 9/2001 |

* cited by examiner

METHOD AND PLANT FOR TRANSFERRING ENERGY FROM BIOMASS RAW MATERIAL TO AT LEAST ONE ENERGY USER

FIELD OF THE INVENTION

The invention concerns a method for producing energy including producing fuel gases from biomass raw material in a main receptacle unit, feeding produced fuel gas to a consumer unit by combustion of the fuel gases in the presence of oxygen, transferring energy from the consumer unit to at least one energy user. The invention also concerns a corresponding plant for producing energy.

BACKGROUND OF THE INVENTION

In a previously known gas turbine power generation plant, fuel gas is produced from solid fuel such as bio fuels, peat and lignite by means of gasification. The produced fuel gas is passed on to a combustor upstream of the gas turbine unit which in turn is coupled to an electric generator as well as to a compressor unit for the supply of compressed combustion air to the combustor.

Lock hoppers are typically used for feed of today's solid fuel gasifiers. An inert gas, such as nitrogen, is used for fire and self-ignition protection purposes. The solid fuel most often is subjected to a mechanical disintegration by means of a tumbling bed or the like, and before filtering, the produced fuel gas is cooled.

As energy recovery from the gasifier operation it is previously known to transfer heat extracted therefrom to a separate steam turbine for power production.

AIM AND MOST IMPORTANT FEATURES OF THE INVENTION

It is an aim of the present invention to at least address issues of the background art power generation methods and plants and to provide a method and a plant wherein the overall total economy of the plant can be improved. This aim is obtained in a method as described above by recovering heat in a flue gas stream downstream of the consumer unit and producing pressurized superheated steam in a steam generator using so recovered heat, intermittently loading biomass raw material into at least one vessel, being included in the main receptacle unit, pressurizing the loaded at least one vessel with pressurized superheated steam, passing pressurized superheated steam through the loaded and pressurized at least one vessel, thereby contacting and heat treating said biomass raw material with the pressurized superheated steam for the production of said fuel gases, supplying produced fuel gases together with still superheated steam to the consumer unit under essentially maintained pressure, and intermittently discharging solid biomass residues from the at least one vessel.

Hereby it is made possible to integrate the production of the fuel gas from solid fuels in a power generation plant to the extent that a less complicated and more efficient process can be utilized. This results in that operation, plant costs and efficiency is improved such that the total economy of the plant is enhanced.

In this text, the definition "biomass raw materials" includes forest raw material, peat, agricultural and other kinds of waste products and lignite.

In this text, "biomass residues" means solids remaining, essentially carbon such as torrified biofuels, charcoal and similar, after treatment in the main receptacle unit.

Using pressurized superheated steam in the main receptacle unit where it is arranged to pass through the loaded and pressurized at least one vessel is advantageous, since it thereby effectively contacts and heat-treats the raw material in an effective way. Having the pressurized superheated steam passing through the at least one vessel ensures reaching and maintaining of the intended temperature.

The pressurized superheated steam is also an excellent protective gas, preventing the produced fuel gas to ignite unintentionally. The pressurized superheated steam is an important energy carrier which is advantageous for the overall energy efficiency of the inventive method since i.a. it allows excellent and cost effective energy recovery in different steps of the method.

The pressurized superheated steam is thus usable for raising and maintaining pressure in the main receptacle unit without the need of any additional measures. Typically, the temperature reached in the main receptacle unit is between 250 and 500° C. In that temperature range, between about 10 and 60% of the biomass raw material will be gasified, depending on parameters such as temperature level material properties, pressure. The produced fuel gas is mainly CO, $CH_4$, $C_xH_y$, (gasified tars) etc.

"Superheated steam" means in this text that the steam is always above the dew point for the entire process, also taking into account that the steam is mixed with fuel gases. This means that no condensation occurs in the fuel gas production process all the way to the inlet to the combustor. The particular rendering the steam to be superheated is determined by prevailing pressure and temperature. Hereby i.a. clogs because of possible occurring liquid water can be avoided.

Pressures from 30 up to 80 bar or even higher pressures inside the main receptacle and throughout the plant upstream of the consumer unit is normal according to the invention.

According to the invention the above advantage is achieved by having the production of the fuel gases from the solid biomass raw material being pressurized at a high pressure and letting the pressurized superheated steam pass through the loaded and pressurized at least one vessel. Hereby it is also automatically possible to reach the advantageous high temperatures that are required in the inventive method and plant in a very efficient and energy saving way.

The gas pressure intended according to the inventive method is easily obtained, for example by simply pumping the recovered water for supply to the steam generator to the required pressure level. In any case, it has been found important for the efficiency of the process to supply fuel gases under high pressure and with the still superheated steam to the consumer unit.

The intermittent operation of the at least one vessel making up the main receptacle unit is advantageous at the pressures and temperatures intended for the inventive method wherein is possible to produce fuel gas having excellent properties. The intermittent operation regarding loading and discharging simplifies handling of various kinds of biomass raw material that would be complicated to pre-treat and supply in a continuous process wherein corresponding result in respect of produced fuel gas at corresponding pressures and temperatures would also require after-treatment of the fuel gas to reach the intended process parameters.

The inventive method is particularly suitable for biomass raw material having grain size 10-20 mm or more for intermittent batch treatment.

In all events, treatment temperatures can be raised in order to gain more gaseous fuel from a given supply of raw material.

Recovering heat in a flue gas stream from the consumer unit will be effected in a heat exchanger taking advantage of the heat carrying properties of the steam in the flue gases. The recovered heat is normally directly usable for the production of pressurized superheated steam in a steam generator.

The main receptacle unit, being the means for the production of fuel gas, includes measures such as a gate valve unit for introduction of the biomass material, thus allowing pressurisation.

It should be noted that a gate valve unit is to be interpreted as covering conventional valves and sluices for solid material and like feeding devices which can be used to intermittently feed solid biomass material such as bio fuels, peat or lignite.

By heat recovery through the production of superheated steam under pressure it is made possible to obtain both pressurization of the production process and at the same time use the produced superheated steam as a process contributor. This is because subjecting of the solid fuel to superheated steam leads to a final solid fuel temperature being reached which invokes carbonization, mainly through pyrolysis in case the process is in absence of oxygen. The solid residues are suitable for use externally or even in the present process after additional gasification treatment or, in certain cases even in solid form.

This means that the solid fuel preferably attains the required temperature during a major part of the time of an ongoing process. Such temperatures are typically also preferably exit temperatures of treated solid fuel from the means for the production of fuel gas from solid fuels.

Besides carbonization resulting in solids, there is created a certain amount of fuel gas in this process step when subjecting solid fuel being biomass such as e.g. forest and agricultural and other waste material, peat and lignite to superheated steam at the above indicated temperature levels.

The invention is particularly suited for solid biomass materials containing fibres since fibre contents in the fuel will become brittle through the treatment process and be easily subsequently disintegrated. Further treatment within the plant and/or external handling and use will be simplified. As an example, this results in that simpler subsequent gasifier equipment can be used.

Continuous steam flow through the main receptacle unit in its pressurized and loaded state contributes with efficient and fast heating of the fuel and associated heat transport. The considerable steam flow and the heating of the fuel also makes possible to heat also metal parts belonging to the equipment whereby condensation of sticky substances is prevented. This can be enhanced by outside heat isolation of the equipment.

Increased temperatures also prevent the formation of sticky deposits on the very fuel preventing it from clogging into unwanted lumps. Sticky tars typically appear at temperatures below about 200° C. The preferred temperatures above about 250° C. inside the equipment therefore ensure that such clogging does not occur.

It should be noted that plant design and operation determines whether all fuel introduced into the plant is to be used for the operation of the plant or whether parts thereof are intended to be used externally.

It is preferred that said supply of superheated steam is arranged such that it effects at least part carbonisation of the raw material.

It is preferred that pressurized superheated steam is entered into and maintained as a stream passing the main receptacle unit such that the biomass raw material is treated in a fluidized state.

Fluidizing i.a. provides for increased process speed and reduces clogging tendencies in addition to the effect of pressurizing. Steam as well as air and even recirculated fuel gas/steam mix, as the case may be can be, used as fluidizing gas (-es) in one or more of: the main receptacle unit, the auxiliary processing receptacle unit (see below).

It is within the invention to add sand particles, dolomite particles or similar to the fluidized bed to enhance fluidization and operation of the created fluidized bed.

It is preferred that the main receptacle unit includes a plurality of vessels that are controlled for supplying an equalized stream of fuel gases and steam from the main receptacle unit to the consumer unit. One possibility is to arrange for sequential operation or having at least the vessels working in steps after one another. Use of plural parallel vessels can be readily arranged for more equalized and at least quasi continuous discharge of fuel gas.

It is important to note that the steam supplied to the main receptacle unit in a very advantageous way also will function as an inert gas for the treatment process in that it shields and prevents unwanted uncontrolled self-ignited combustion of the fuel.

In an advantageous preferred embodiment, said discharged solid biomass residues are supplied to an auxiliary processing receptacle unit where they are preferably continuously gasified in a pressurized environment in the presence of superheated steam to form fuel gas. This has many advantages: Fuel gas from the auxiliary processing receptacle unit can be combined with the fuel gas from the main receptacle unit to further equalize the fuel gas stream to a consumer unit. Preferably the discharged solid biomass residues are disintegrated before they are supplied to the auxiliary processing receptacle unit. As is explained above, the disintegration is simple since the treatment in the main receptacle unit has made the biomass residues brittle. Preferably, the residues are ground to a particle size <2 mm preferably <1 mm, whereby gasification in the auxiliary processing receptacle unit can be made easy. This also makes it easy to maintain a continuous operation in the auxiliary processing receptacle unit.

The disintegrated residues have high energy density and are easily introduced continuously into the auxiliary processing receptacle unit.

Preferably the solid biomass residues are treated in the auxiliary processing receptacle unit at a treatment temperature range exceeding a treatment temperature range in the main receptacle unit. Typically, a temperature range about a temperature range of about 250-500° C. and preferably about 280-350° C. in the main receptacle unit results in low proportion of gas (10-20% of energy contents) and excellently pretreated brittle solid residues that are easy to disintegrate for subsequent treatment. When the temperature in the auxiliary processing receptacle unit amounts to a temperature range of about 400-600° C. and preferably about 430-500° C., about 40-60% of energy contents in the biomass raw material will be formed into fuel gas and the remaining part will be pulverized charcoal having fine grain. Said pulverized charcoal can be e.g. made into pellets etc.

Pressure in both the main receptacle unit and the auxiliary processing receptacle unit is preferably in the range 50-80 bar.

If necessary, depending on process parameters, flow speeds etc. superheated steam is possibly mixed with or introduced together with an optional supply of oxygen both the main receptacle unit and the auxiliary processing receptacle unit to increase temperature and support gasification. Typically, a controlled supply of air under pressure may be supplied to an inlet of the main receptacle unit for effecting controlled limited combustion and thereby increased fuel temperatures.

Oxygen/air may be combined with supply of steam such that air and steam are mixed at or before said inlet.

It is preferred that flow of fuel gases from the vessels of the main receptacle unit and from the auxiliary processing receptacle unit to the consumer unit is regulated so as to maintain a continuous equalized supply of fuel gases to the consumer unit. This can be realized in different ways, i.a. through providing a constant flow valve and/or an intermediate equalizing accumulator in fuel delivery conduit.

Preferably part of fuel gas and steam exiting the main receptacle unit is entered into the auxiliary processing receptacle unit. This contributes advantageously to the possibilities of reaching desired higher temperatures in the auxiliary processing receptacle unit.

Solid biomass residues still remaining after treatment in the auxiliary processing receptacle unit are optionally passed on to a gasifier wherein they are gasified in the presence of superheated steam and an optional supply of oxygen.

Preferably the consumer unit is coupled for providing power to a compressor unit and for receiving supply of combustion air from the compressor unit.

The invention also relates to a plant for producing energy including: a main receptacle unit for producing fuel gases from biomass raw material, means for feeding produced fuel gas to a consumer unit wherein the fuel gases are combusted in the presence of oxygen, means for transferring energy from the consumer unit to at least one energy user. The inventive plan includes a steam generator with heat exchange means is arranged for recovering heat in a flue gas stream from the consumer unit and arranged to produce pressurized superheated steam using so recovered heat, a loading arrangement for intermittently loading biomass raw material into at least one vessel, being included in the main receptacle unit, means for introducing pressurized superheated steam for pressurizing the loaded at least one vessel, means for passing pressurized superheated steam through the loaded and pressurized at least one vessel for contacting said biomass raw material with the pressurized superheated steam for heat treating the biomass raw material and production of said fuel gases, supply means for supplying produced fuel gases together with still superheated steam to the consumer unit under essentially maintained pressure, and discharge means for intermittently discharging solid biomass residues from the at least one vessel. The advantages of the corresponding method is also obtained through the inventive plant. Subordinate device features result in advantages outlined in respect of the corresponding method features described above.

Preferably, the compressor unit is provided with split exits for compressed air at different pressure levels. This has the advantage that compressed air supply to the main receptacle unit and to the auxiliary processing receptacle unit can be delivered at chosen pressures that are typically higher than the pressure of compressed air delivered to the consumer unit. The reason for this is that passage of conduits, valves, and different vessels containing material results in certain flow resistance and pressure drop problems. This aspect of the invention will help overcoming these problems.

Preferably the energy user is an electric generator for the production of electric energy.

Preferably fuel gas and steam are mixed upstream of or in the combustor.

It is preferred that water is recovered in the flue gas stream through a condenser supplying water to the steam generator for production of superheated steam and that water contents and residual heat is recovered in the flue gases through condensation. Preferably residual heat recovered through condensation is used for pre-treatment of the biomass material, for example drying.

It is also possible that pulverized charcoal being residues from the main receptacle unit and/or from the auxiliary processing receptacle unit, if necessary after disintegration, is entered into the consumer unit for combustion together with fuel gas and in particular that pulverized charcoal is forwarded to the consumer unit in a stream also including superheated steam.

Fuel gases are normally at least partly in the form of pyrolytic gas (process without oxygen).

Advantageously the consumer unit includes a power unit being a turbine arrangement, an internal combustion engine or an internal combustion engine with a turbo charger.

It is preferred that the fuel gas supplied to the consumer unit mixed with superheated steam in adjustable proportions.

It is preferred that heat is extracted from discharged solid biomass residues for use for pre-treatment of solid biomass raw material for further heat recovery in the process.

It is also preferred that it is arranged for transmitting at least part of the steam supplied to and used in the main and auxiliary receptacle units to the consumer unit since this simplifies subsequent energy recovery and plant operation in the direction of stoichiometry.

Advantageously a solid fuel drier is arranged for receiving raw fuel and for delivering dried fuel to the main receptacle unit.

In an advantageous aspect of the invention the plant includes means for supplying treated remaining solid fuel to the combustor. This results in many advantages. Hereby it is possible to provide for faster regulation of fuel supply to the combustor and thereby of the entire plant by simply feeding solid fuel in addition to fuel gas when required. By providing means such as a solid-gas blender and appropriate conduits and valves it can further be arranged to mix treated remaining solid fuel with fuel gas and steam to be subsequently supplied as a stream of solid fuel particles having fuel gas/steam as carrier gas to the combustor.

When a fuel gas-steam mixer is arranged upstream of or in the combustor it is possible to obtain reduced temperatures in the gas before filtering. It also results in increase steam contents in the fuel gases for positively effecting combustion.

Preferably a condenser is positioned for water recovery in the flue gas stream, said condenser having a connection for water supply to the steam generator.

According to an advantageous aspect, the flue gas stream from the consumer unit upstream of the steam generator is supplied with flue gases from an auxiliary combustor being positioned downstream of the consumer unit. This aspect makes it possible to enhance steam generation operation without requiring excessive amounts of compressed air, which had been necessary if the corresponding amount of heat would have to be produced in a gasification system by introducing compressed air. Instead, the auxiliary combustor can work at low pressure and even directly with air at atmospheric pressure. This results in several advantages: 1. Less $NO_X$ gas contents in the exhaust gases. 2. Cleaner fuel gases with lower N gas contents. 3. Lower requirements for compressed air in the process, which in turn reduces compressor work requirements and, as a consequence, better electricity production efficiency and overall plant economy.

An auxiliary combustor being positioned downstream of the consumer unit is also synergetic with reheating devices for heating gas flows at particular positions for e.g. enhancing lean flue gas emission (low N contents) of the plant. These reheating devices also extract heat from gas flows at other positions as well as devices in the plant as outlined in the below description and transfer so extracted heat for said reheating.

The compressor unit is suitably coupled for the supply of combustion air also to the auxiliary processing receptacle unit which is also preferably arranged for the reception of steam from the steam generator and/or of mixed produced fuel gas/steam under pressure from the main receptacle unit for auxiliary purposes such as for fluidising.

Supply of produced fuel gas also from the auxiliary processing receptacle unit to the consumer unit results on the one hand in that a continuous flow of fuel is made more easy, on the other hand makes it possible to continue heat treatment of solid fuel and to provide, through controlled limited air admission, to provide for raising of the temperature in the auxiliary processing receptacle unit to a desirable level.

Corresponding advantages are obtained in respect of the corresponding plant claim features.

BRIEF DESCRIPTION OF THE DRAWINGS

The invention will now be described in greater detail by way of embodiments and with reference to the annexed drawings, wherein.

DESCRIPTION OF EMBODIMENTS

In the Figs., same or similar elements are depicted with the same reference numerals. In the description, explanations of same or similar features are not repeated. In the following, see descriptions of previously explained embodiments for explanation of the reference numerals not appearing related to the specific Figs. Individual features explained in relation to different embodiments and Figs. can be combined and used in other embodiments.

Figure 1:
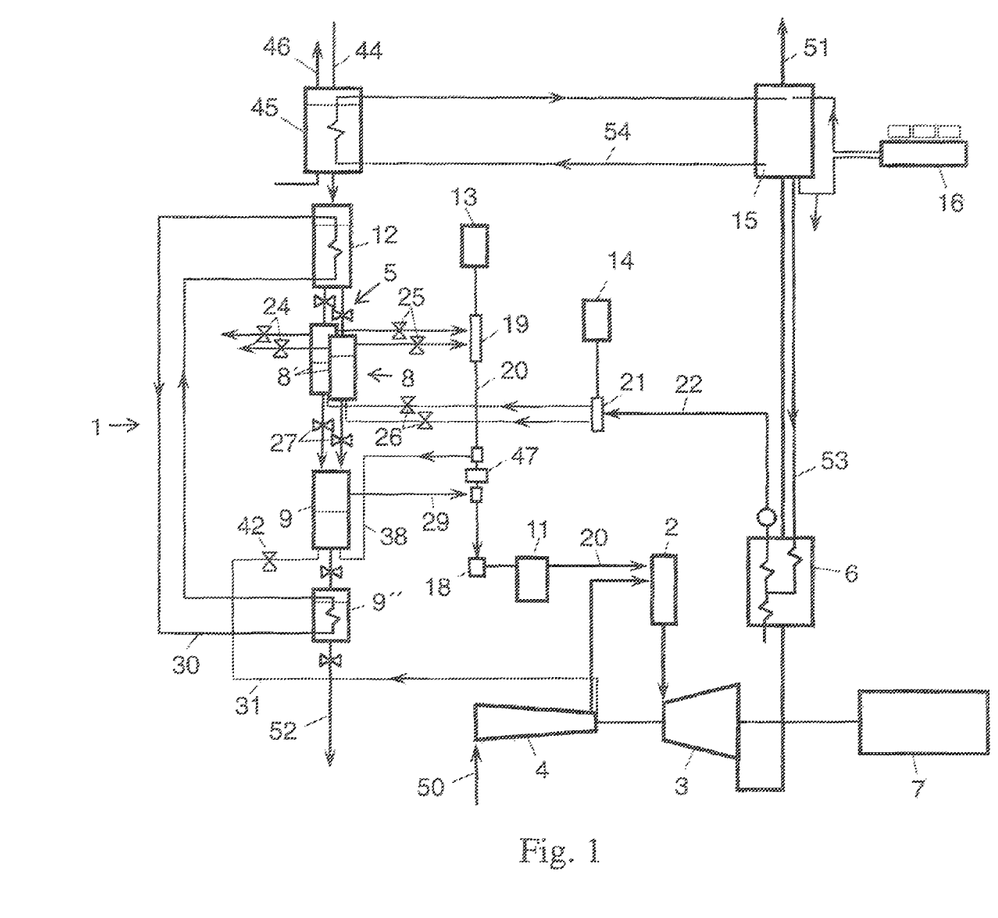
FIGS. 1-10 show different layouts of plants according to the present invention.

FIG. 1 illustrates a power generation plant where the consumer unit includes a combustor 2 and a gas turbine unit 3, wherein a means for the production of fuel gas from solid fuel, here biomass raw material, is indicated with 1. Fuel gas so produced is passed on to the combustor 2 which in a per se known manner produces flue gas which under high pressure is delivered to the gas turbine unit 3. The turbine unit 3 in turn drives a power generator 7 for the production of electric energy and also a compressor unit 4 for compressing air for combustion that is passed on to the combustor 2. An entry for air to the compressor unit 4 is indicated with 50.

Solid fuel is typically passed on to a silo 12 for the intermediate collection of relatively dry solid fuel in the order of 10-20% moisture, which normally means that the solid fuel has been subjected to some kind of drying process before entering the silo 12. In the shown embodiment this is accomplished in that a conduit 54 is arranged for transferring residual heat recovered in a condenser 15 downstream of the turbine unit 3 to a dryer vessel 45 for biomass material entered through an inlet 44. Dry air can be transferred to the dryer vessel 45 over conduit 46 and be subsequently exited for the purpose of dehumidifying the biomass raw material.

In order to produce fuel gases to the combustor 2, the silo 12 is arranged to intermittently pass on material over a gate valve unit 5 which can consist of a plurality of sluices, ordinary valves, feed screws or the like to a main receptacle unit 8 which can be comprised of one or more vessels 8' being connected in parallel for sequential operation. In order to obtain an equalized, quasi continuous flow of fuel gas already from the main receptacle unit 8, two or more vessels 8' being connected in parallel for sequential operation is desired.

Steam is heated in a steam generator 6 being positioned in the exhaust line downstream of the gas turbine unit 3. This provides superheated steam under pressure through conduit 22 and over a steam distributor 21, which is connected to an accumulator 14, and branch line (-s) to the main receptacle unit 8 over valves 26 in order to intermittently pressurize vessels 8' of said main receptacle unit 8.

Further, a continuous supply of the superheated steam from the steam generator 6 to the vessels 8' being included in the main receptacle unit 8 when these vessels are in the pressurized and loaded state functions for heat treatment of the solid fuel. This is achieved when pressurizing to an operational pressure (in this embodiment typically of about 20-70 bar) has been reached by providing a flow of superheated steam through the vessel (-s) 8' and through the fuel to be treated therein such that a resulting temperature of about 250-350° C. and preferably about 280-300° C. is reached inside the vessels 8'. Hereby the solid fuel will be carbonized through pyrolysis. At the same time a certain amount of fuel gas will be produced, which, together with the steam, over a conduit or conduits 20 will be passed on to the combustor 2 for combustion of the fuel gas. 25 indicates valves downstream the individual vessels 8'. 24 indicates pressure release valves.

Numeral 13 indicates an accumulator for equalizing pressure and flow into a connection 19 in the conduit downstream of the main receptacle unit 8.

After completed treatment in the main receptacle unit 8 remaining, now carbonized solid fuel, will be delivered to an auxiliary processing receptacle unit 9. 27 indicates valves regulating delivery from the individual vessels 8'. An optional fuel mill at the inlet of the auxiliary processing receptacle unit 9, can be arranged for disintegrating remaining, now carbonized solid fuel to get even better properties for subsequent gasification.

Through a conduit 38, a fuel gas and steam mix flow can be branched off from the conduit 20 for entry into the auxiliary processing receptacle unit 9. 47 indicates a regulator unit arranged to regulate gas flow to the auxiliary processing receptacle unit 9.

A conduit 31 for air feed leads compressed air from the compressor unit 4 to an air inlet in the auxiliary processing receptacle unit 9 for allowing limited combustion so as to keep up the temperature in that unit, continue the carbonization process and also make possible further formation of fuel gas, which together with steam is led over conduit 29 to conduit 20. A valve 42 is arranged in the conduit 31 for control of the compressed air flow.

The gas flow over conduit 29 is mixed in a mixer with a steam and fuel gas mixture coming from the main receptacle unit 8. After mixing, the gas is filtered in a hot gas filter 11 before it is fed over conduit 20 to the combustor 2.

Possible remaining solids are collected in a collecting vessel 9" for later transport for external use over conduit 52. 30 indicates a circuit for recovering remaining heat in treated and not used solid fuel, said heat being transferred to the dry silo 12 in order to enhance temperatures and reduce water contents in incoming material, thereby making the fuel gas production process more efficient. Humidity in the material can be reduced by supply of dry air.

Further, in FIG. 1 there is shown a steam vessel 14 acting as an accumulator for superheated steam in the conduit 22 and steam distributor 21.

The condenser 15 for heat and water recovery is positioned in the exhaust downstream of the turbine unit 3 so as to recover water contents in flue gases and recover heat during that process. An air cooler co-operating with the condenser 15 is indicated with 16. 51 indicates an flue gas exit channel. 53 indicates a conduit for leading water obtained by the condenser 15 to the steam generator 6.

Valves are arranged to control the air, steam and fuel gas flows at different positions in the various supply conduits. Not all of these valves are shown in FIG. 1, and it should be noted that normally all flows are subject to regulation.

The plant is also equipped with (not shown) sensors such as temperature and flow sensors in the components and in the conduits for sensing the prevailing operational conditions. A CPU receives signals from the sensors and sends regulatory signals to said valves as responses to sensed values when they are compared to pre-stored and/or calculated target values.

In short, a treatment sequence in one vessel 8' can be as follows:

1. Valve in gate valve unit 5, valve 26 in steam supply branch line, valve 25 in fuel gas conduit, valve 27 for carbonized solid fuel outlet—all these four valves being associated with the one vessel 8' in question are all closed or closes.

2. Valve 24 opens for pressure release of vessel 8' and closes when pressure has been released.

3. Valve in gate valve unit 5 opens and solid untreated material is let into vessel 8'. Valve closes when the accurate amount of material has been received.

4. Valve 26 opens for pressurizing and heating vessel 8' with superheated steam. It should be noted that during pressurizing, steam related parameters are preferably controlled in order to maintain the steam in its superheated condition. It can as an example be necessary to arrange for higher steam flow such as e.g. to slightly open valve 24 to permit additional flow of steam to pass through the vessel 8'.

5. When accurate pressure has been reached and fuel gas has started to form, valve 25 opens to let a flow of steam and fuel gas be passed to the combustor 2. Two or more vessels 8' can be coupled in series connection with each other when it comes to fuel gas and steam flow, even though they are coupled in parallel when it comes to solid material flow.

6. When fuel formation has dropped below a determined level and/or carbonisation of the contained fuel is considered to have been completed or simply after a chosen time period, the valves 25 and 26 are closed, valve 27 opens for passing carbonised solid fuel to the fuel vessel 9.

7. The sequence is repeated. During non operation of one vessel 8' one or more other (-s) is/are operative. It is not excluded that plural vessels are operative at the same time.

Pressure gas through the release valve 24 can be recovered and possibly at least in part be fed to the turbine or be stored in a separate container for various uses such as for re-pressurizing the main receptacle unit.

Figure 2:
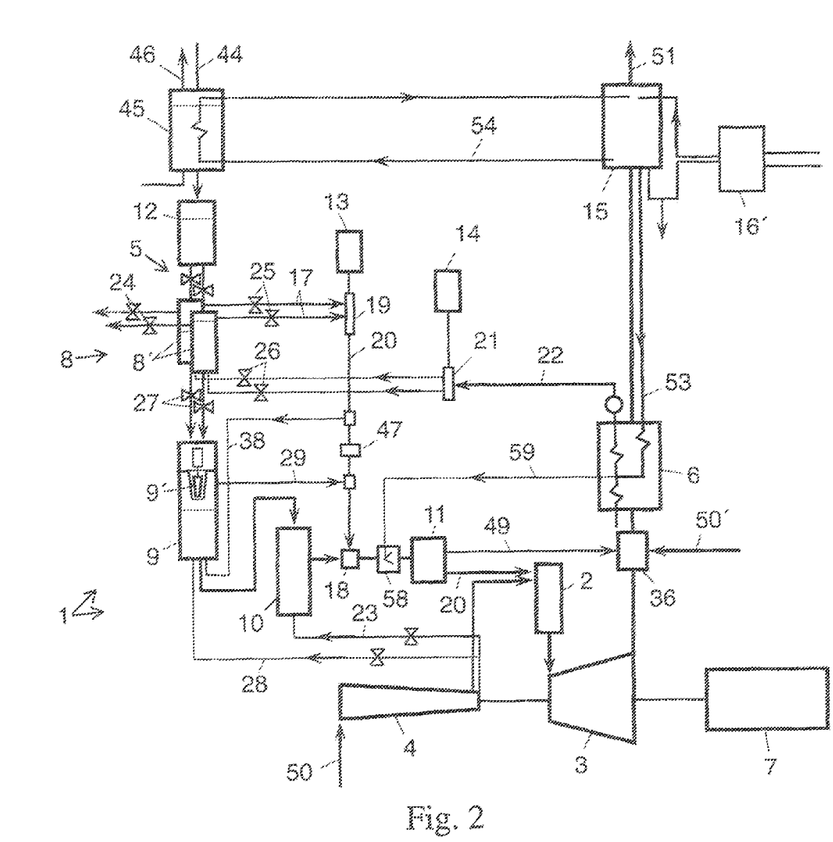

FIG. 2 shows a slightly modified second embodiment of the invention. A mill 9' is arranged at the inlet of the auxiliary processing receptacle unit 9. Solid residues from the main receptacle unit are in its disintegrated state treated as is explained above in the auxiliary processing receptacle unit 9.

Still solid material remaining after this treatment is controllably fed to a gasifier 10 for gasifying through partial combustion of the remaining solid fuel. It is not excluded that also pulverulent solid fuel is fed to the combustor in addition to fuel gas.

A conduit 23 for gasifier air feed leads compressed air from the compressor unit 4 to an air inlet in the gasifier 10.

Further, there is provided an auxiliary combustor 36 downstream of the consumer unit (in this case the turbine unit 3) as seen in the exhaust conduit. This auxiliary combustor 36 has the purpose of filling up energy requirement in the steam generator for the production of greater amounts of superheated steam and/or higher temperatures. 49 indicates a conduit for delivering fuel gas and superheated steam from the conduit 20 to the auxiliary combustor 36. 50' indicates an oxygen supply to the auxiliary combustor 36.

Reference number 16' indicates a district heating device in co-operation with the condenser 15.

A hot water supply is lead through a conduit 59 to a water spray device 58 arranged in the fuel feed conduit 20 upstream of the filter 11 for the purpose i.a. of cooling the gases before introducing them to the filter 11.

No circuit 30 is present in the second embodiment. Otherwise the main features of the embodiment in FIG. 2 essentially correspond to the one in FIG. 1.

Figure 3:
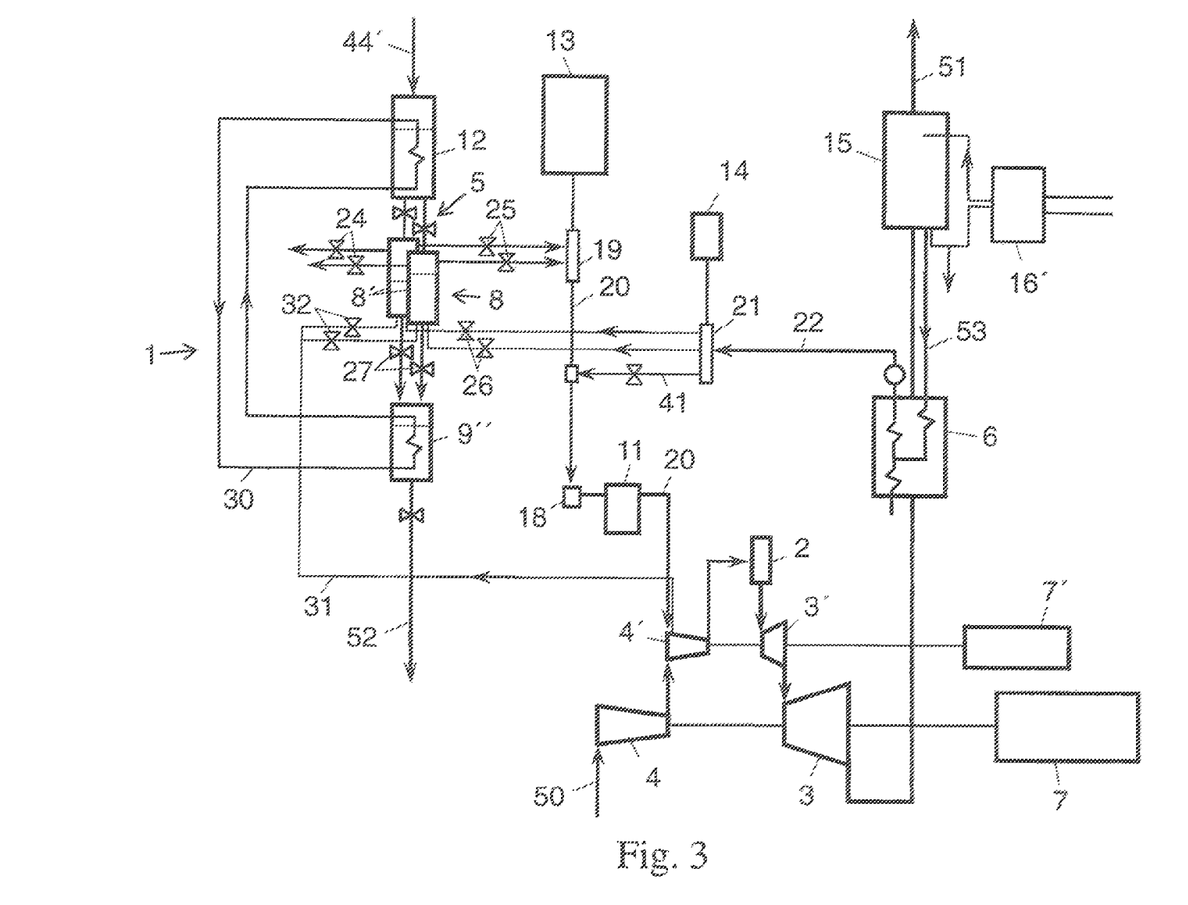

The embodiment of FIG. 3 shows, as compared to the FIG. 1 embodiment, that the auxiliary processing receptacle unit 9 is dispensed with. Pre-treatment may be provided before the silo 12 but is not shown in FIG. 3. 41 indicates a conduit for feeding superheated steam directly to the conduit 20 (for fuel and steam feed).

The consumer unit has been changed in that the turbine-compressor unit 3, 4 has been supplemented with an intermediate turbine-compressor unit 3', 4'. This intermediate turbine-compressor unit 3', 4' is a so called top-spool arrangement which serves to increase efficiency. The intermediate turbine-compressor unit 3', 4' drives an auxiliary generator 7'. For further explanation of the top-spool arrangement it is referred to U.S. Pat. No. 7,721,552 (B2) (Euroturbine AB).

Produced fuel gas is here entered into a compressor circuit before the high pressure compressor of the intermediate turbine-compressor unit 3', 4'. This makes it possible for the entire means for the production of fuel gas 1 as well as for the superheated steam generator 6 to operate at lower pressures that what prevails at an inlet of the combustor 2.

A conduit 31 for controlled (through valves 32) air feed leads compressed air from the compressor unit 4 to (an) air inlet (-s) in the main receptacle unit 8. Hereby limited combustion can take place already in the main receptacle unit 8 resulting in rising temperature.

Figure 4:
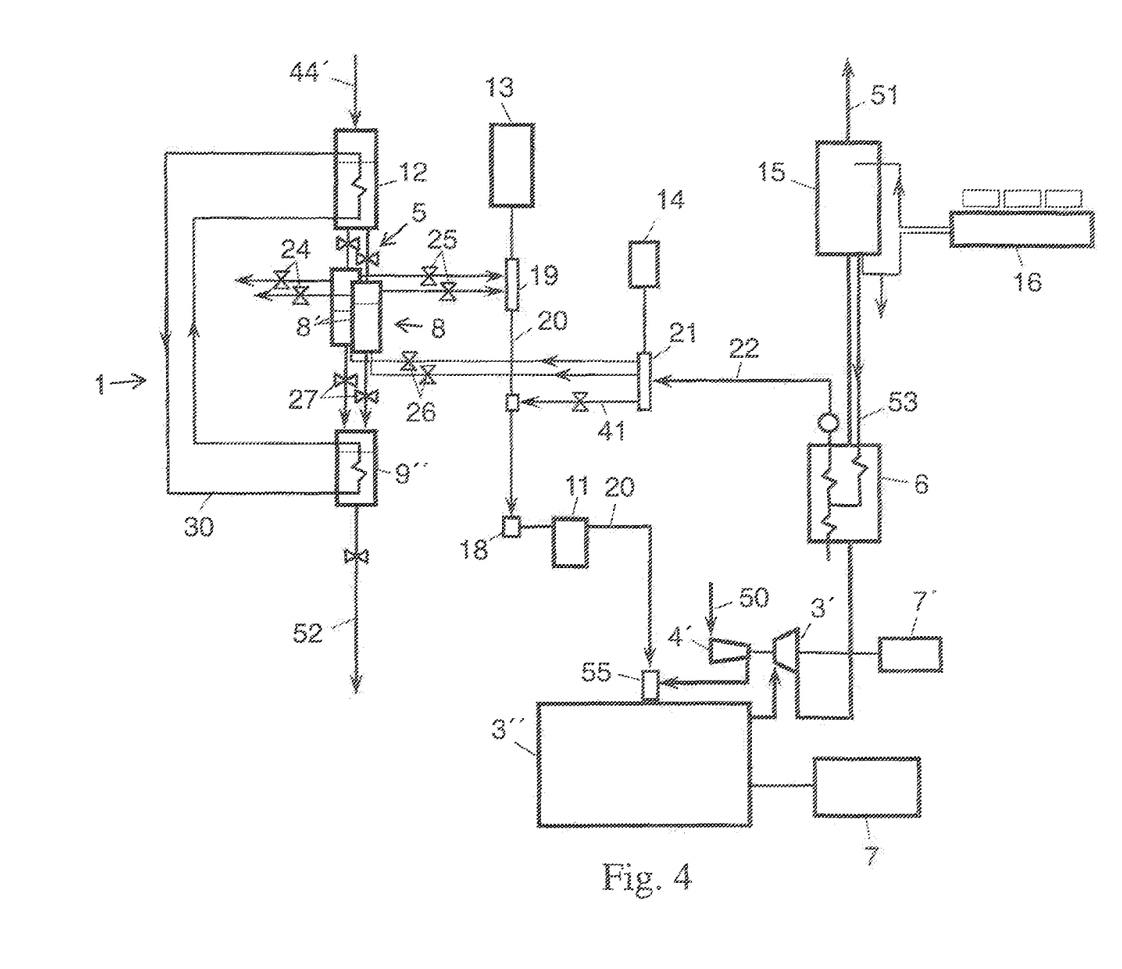

In FIG. 4 is shown an embodiment like the one in FIG. 3 but with a turbocharged (with a turbine-compressor unit 3', 4') internal combustion engine 3". In this embodiment, like in the FIG. 3 embodiment, the pressure in the circuit including the main receptacle unit 8 can be relatively lower.

55 indicates a mixer for mixing compressed air from the compressor unit of the turbo charger with fuel gas prior to injection into the engine 3".

7' indicates an optional auxiliary electric generator being powered by the turbine of the turbine-compressor unit 3', 4'.

Figure 5:
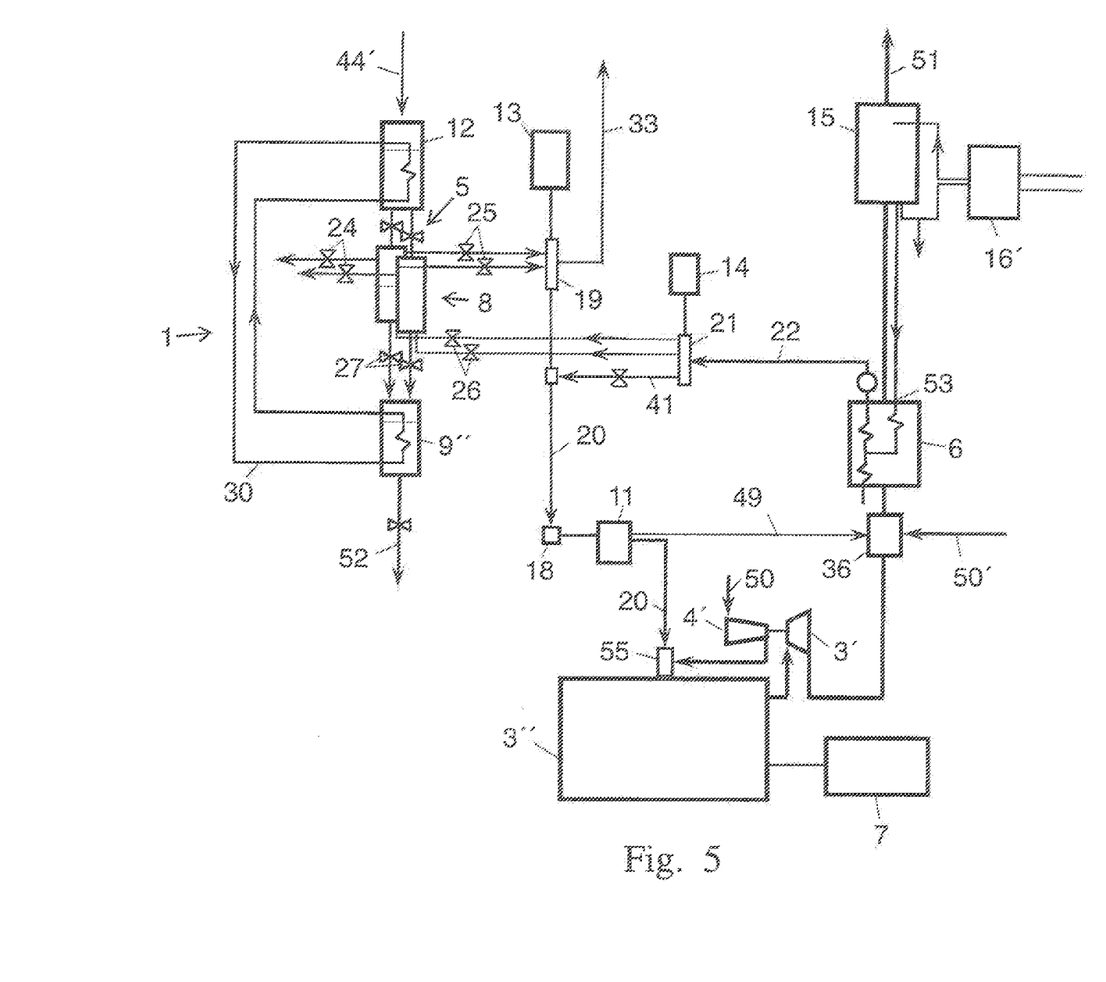

According to the embodiment in FIG. 5, which is a further development of the FIG. 4 embodiment, there is provided means for delivering fuel gases produced in the main receptacle unit 8 for external use through a conduit 33. This embodiment covers plants wherein produced gases in respect of the treatment in the main receptacle unit 8 being in excess of what is required for the consumer unit.

Figure 6:
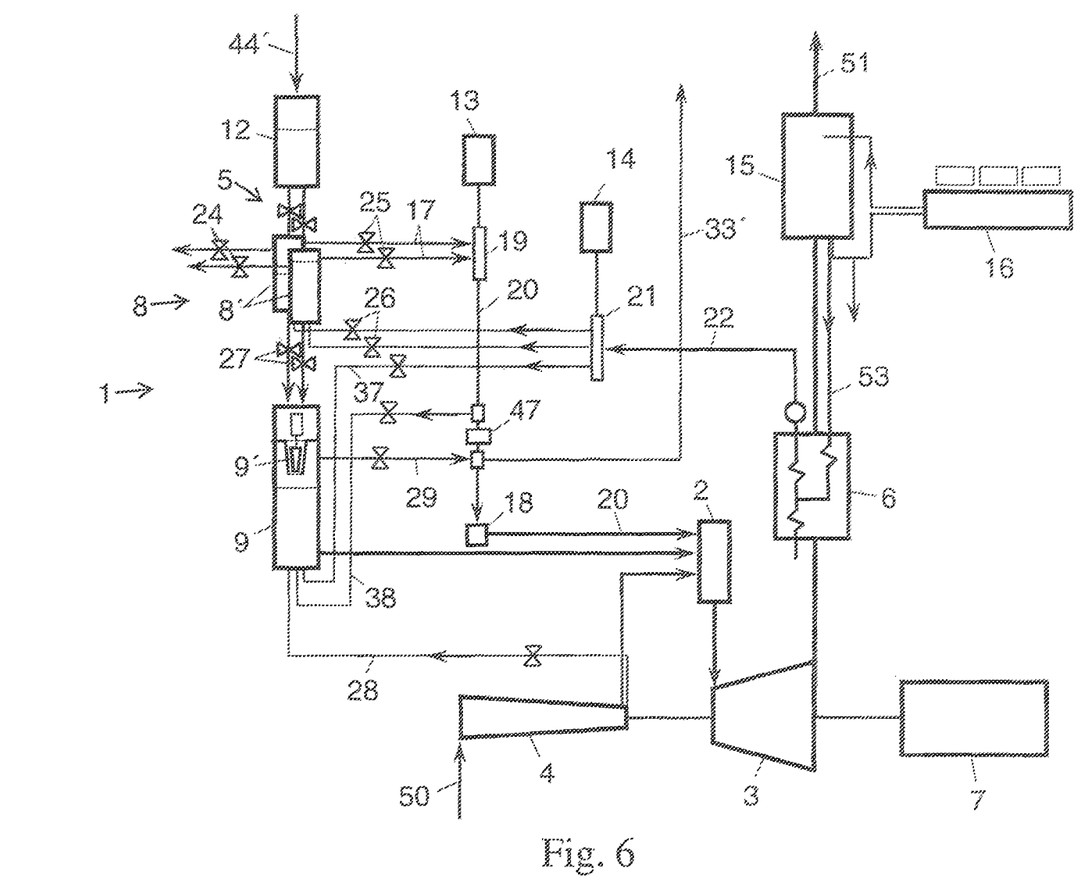

FIG. 6 shows a simplified version of the embodiment shown in FIG. 2. The gasifier 10, the filter 11, the water spray device 58 and the dryer vessel 45 have been dispensed with. Solid pulverulent coal from the auxiliary processing receptacle unit 9 is directly entered into the combustor 2.

The FIG. 6 embodiment also features a connection from the fuel conduit 20 close to the auxiliary processing receptacle unit 9 for delivering part of the fuel gas produced in the main receptacle unit 8 and the auxiliary processing receptacle unit 9 for external use through a conduit 33'.

37 indicates a conduit for delivering "fresh" superheated steam directly to the auxiliary processing receptacle unit 9.

Figure 7:
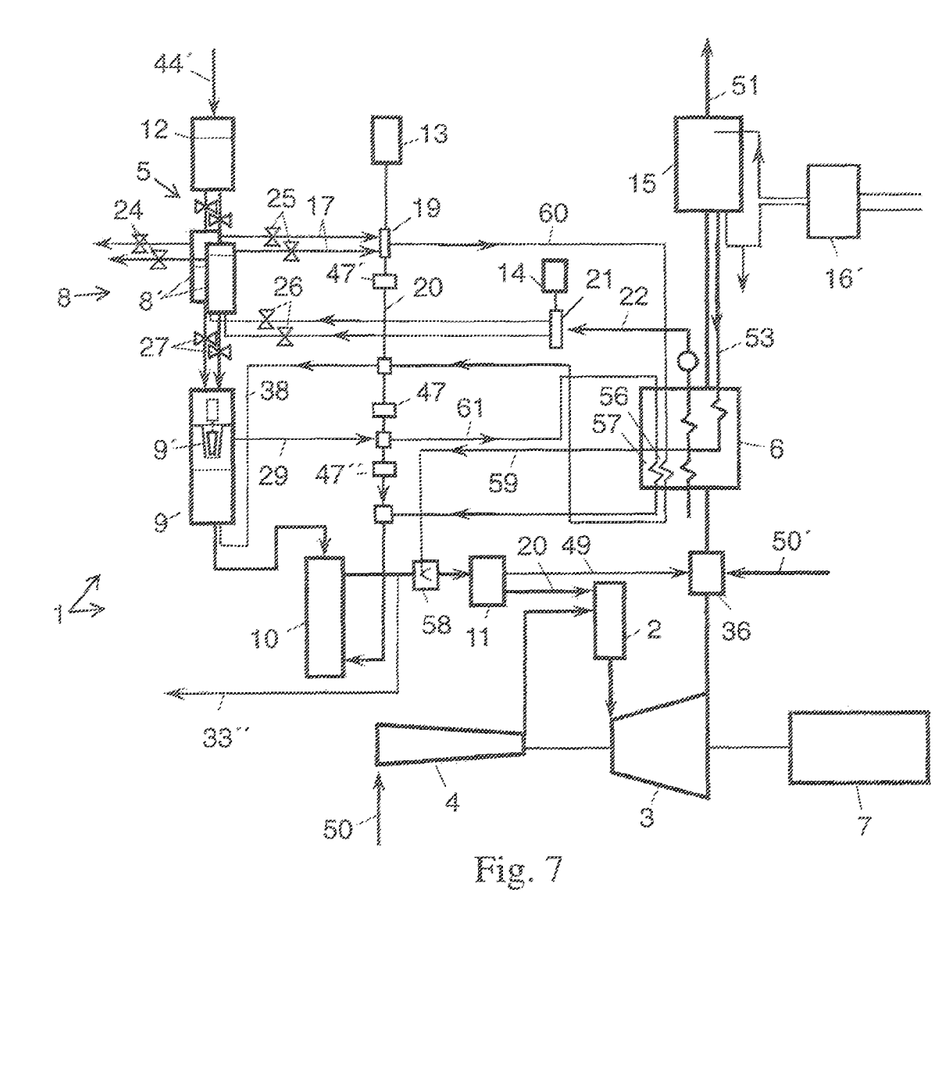

In the FIG. 7 embodiment there is provided a connection from the fuel conduit 20 downstream of the gasifier 10 for delivering part of the fuel gas produced in the main receptacle unit 8, in the auxiliary processing receptacle unit 9 and in the gasifier 10 for external use through a conduit 33".

A reheater 56 for steam/fuel gas is included as a part of the (superheated) steam generator 6 and is arranged to extract heat from the (superheated) steam generator 6 and to raise the temperature in the mix of superheated steam and produced fuel gas. For that purpose, a first reheater conduit 60 is branched off from said connection 19 in the fuel gas conduit 20 downstream of the main receptacle unit 8 so as lead the gas mix to be reheated to the steam generator 6 and to reintroduce the reheated gas mix into the fuel gas conduit 20 at a position where the conduit 38 is branched off from the conduit 20 for entry into the auxiliary processing receptacle unit 9. As an alternative, or also, a second reheater conduit 61 is branched off from the fuel gas conduit 20 at or adjacent to the inlet from the auxiliary processing receptacle unit 9 into the fuel gas conduit 20 so as lead the gas mix to be reheated to the steam generator 6 and to reintroduce the reheated gas mix into the fuel gas conduit 20 at a position further downstream in the fuel gas conduit 20 but upstream of the gasifier 10. As another alternative a separate reheater unit (not shown) being arranged in the fuel gas conduit 20 for reheating the gas mix upstream of the auxiliary processing receptacle unit 9 and/or the gasifier 10 can have a connection for extracting heat from the steam generator 6 or from another process heat source, e.g. a fuel gas flow for external use.

The measure of this way reheating the gas mix in the fuel gas conduit 20 advantageously eliminates or at least reduces the requirements for supply of oxygen to the auxiliary processing receptacle unit 9 and/or to the gasifier 10 respectively since it gives the opportunity to reach very high temperatures in the gas mix through such reheating arrangement. For that reason, no air supply to the gasifier 10 is indicated in FIG. 7.

Reheating is thus, in general, highly preferred, since it results in several advantages: 1. Less $NO_X$ gas contents in the exhaust gases. 2. Cleaner fuel gases with lower N gas contents, specially preferred for fuel gas/syncgas export. 3. Lower requirements for compressed air in the process, which in turn reduces compressor work requirements and, as a consequence, better electricity production efficiency and overall plant economy. As is indicated above, reheating is particularly valuable together with an auxiliary combustor positioned downstream of the consumer unit. See the above discussion.

Figure 8:
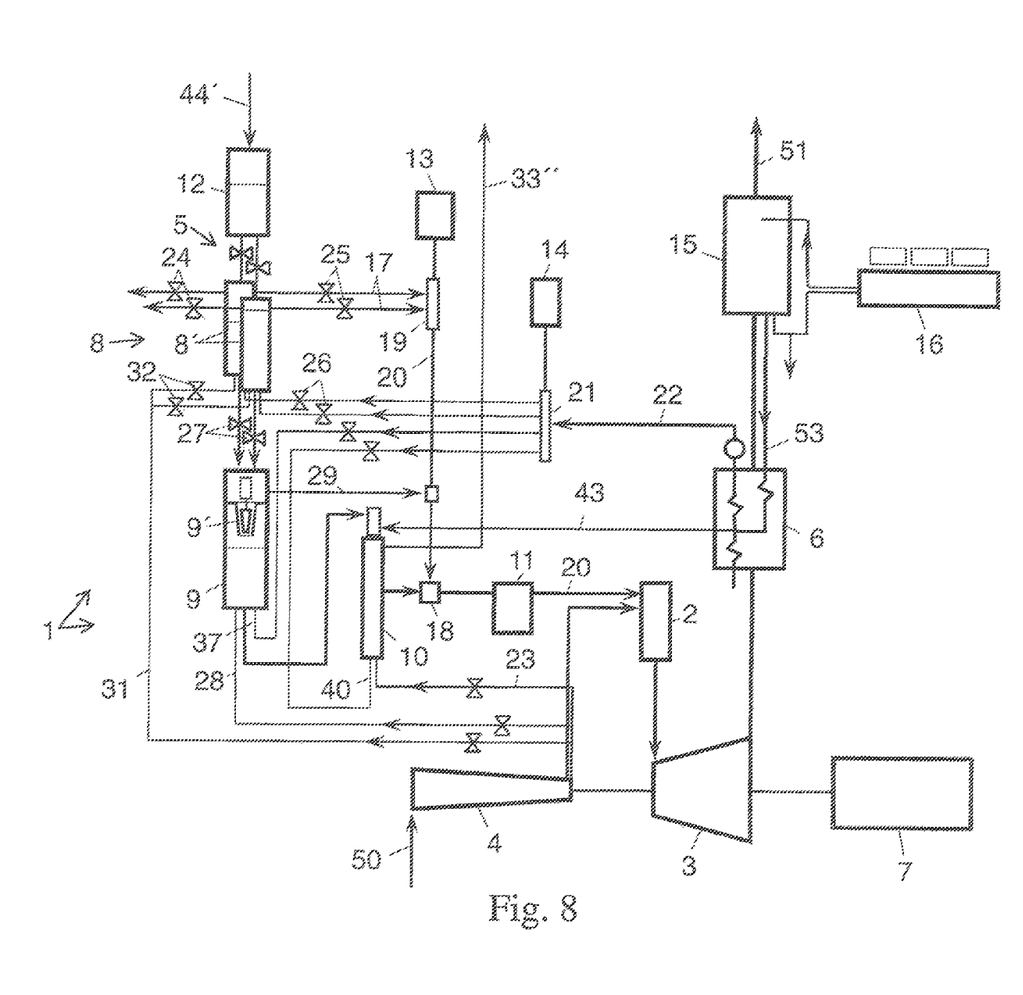

The embodiment in FIG. 8 is further developed in respect of the FIG. 7 embodiment in that the gasifier 10 is supplied with hot water from a particular water exit from the steam generator. The water is mixed with solids from the auxiliary processing receptacle unit 9 before entering the gasifier 10 which is also supplied with compressed air via conduit 23 and superheated steam through a conduit 40 from the steam generator 6. Also the auxiliary processing receptacle unit 9 is supplied with compressed air via conduit 28 and superheated steam through a conduit 40 from the steam generator 6.

A compressed air supply to the main receptacle unit 8 is also provided in order to enhance the carbonisation and fuel gas forming process in the main receptacle unit 8. See FIG. 3 and the above.

Figure 9:
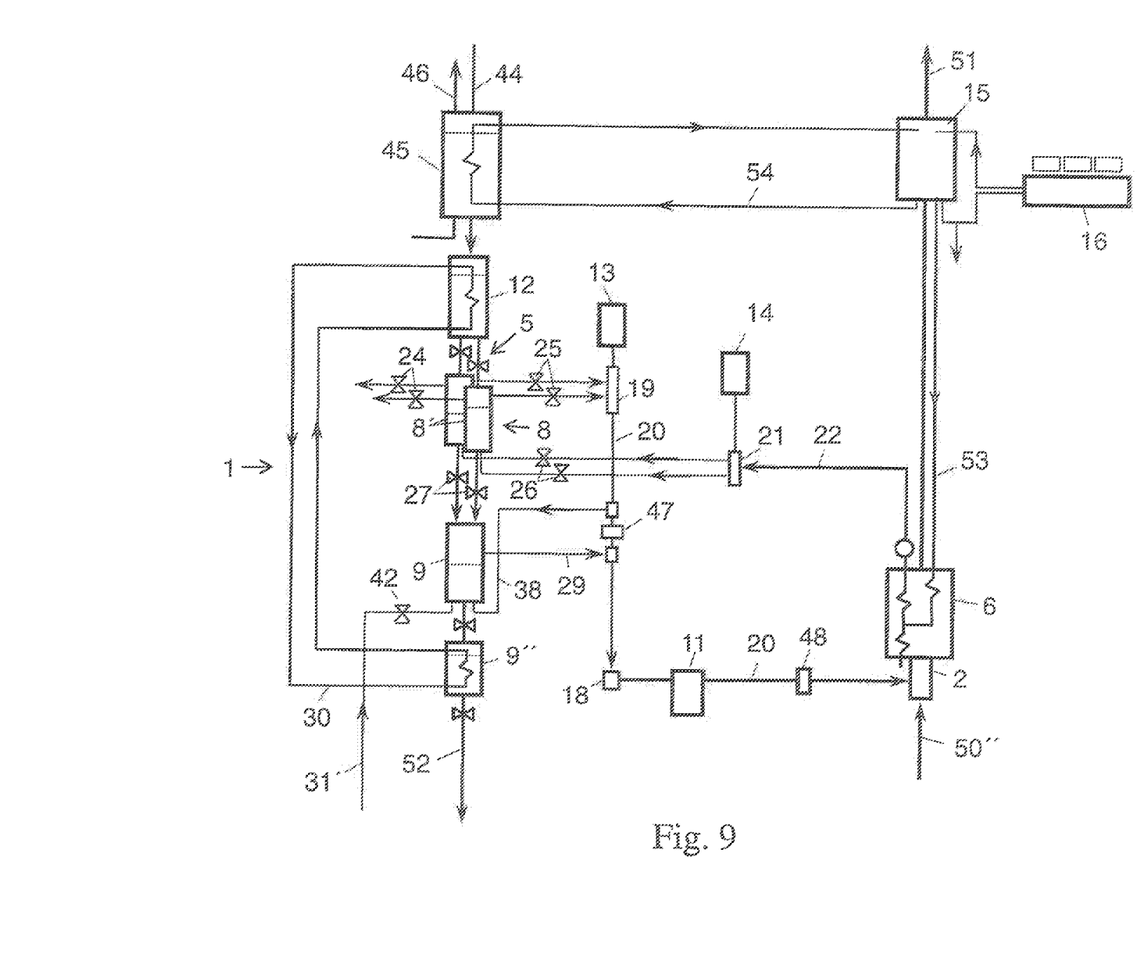

In the embodiment in FIG. 9, the consumer unit is simply a combustor 2 being directly associated with the superheated steam generator. An overpressure is provided in the circuit including the means 1 for the production of fuel gas from solid fuel. 31' indicates a conduit for supply of air to the auxiliary processing receptacle unit 9 over the valve 42. 48 indicates a pressure or flow regulating means.

Figure 10:
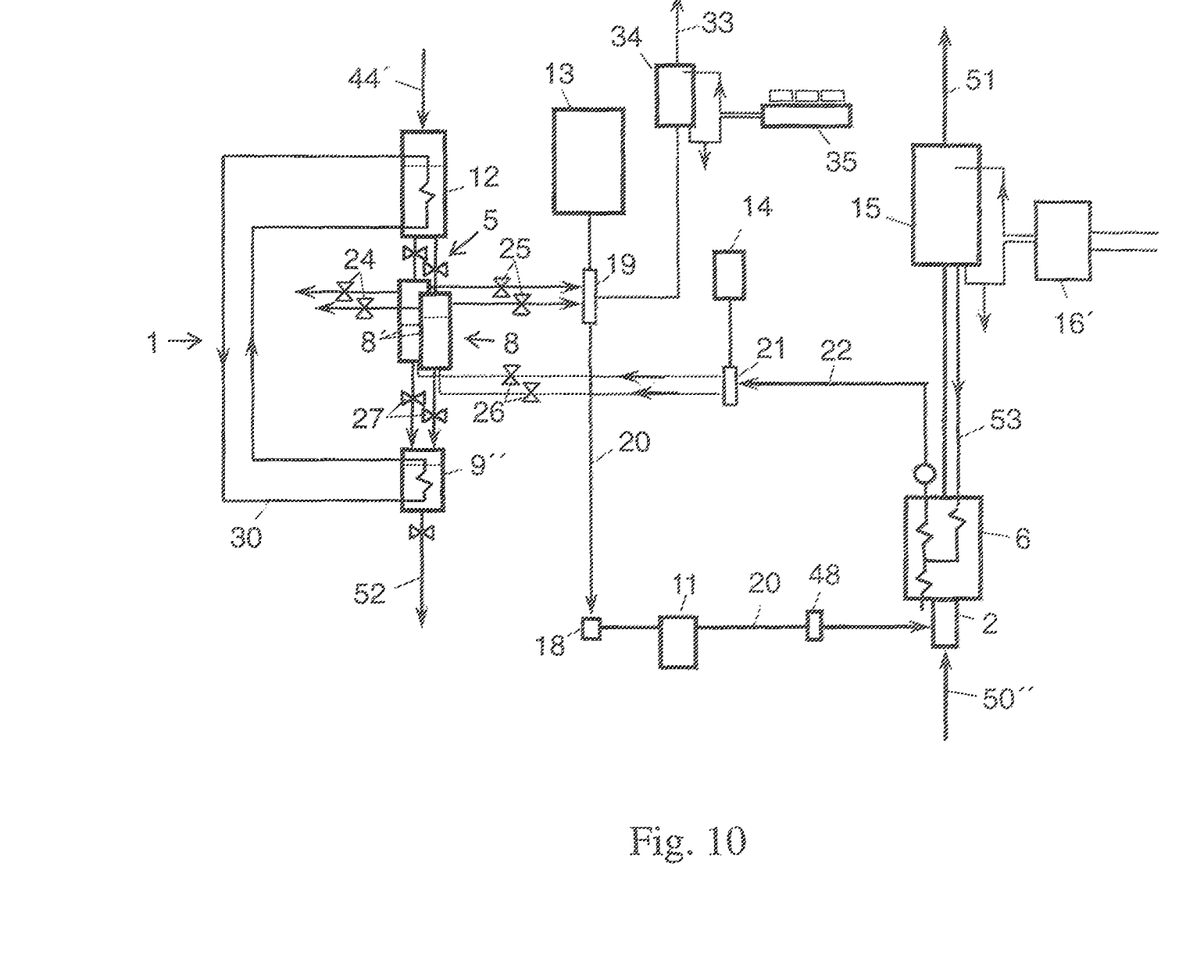

FIG. 10 shows a simplified version of the FIG. 9 embodiment, wherein i.a the auxiliary processing receptacle unit 9 has been dispensed with. It is arranged for leading excess fuel gas over the conduit 33 for external use.

A further condenser 34 is arranged for heat exchange with fuel gases for external use. Extracted heat and water is transferred for steam generation in the plant. Numeral 35 indicates an air cooler co-operating with the condenser 34.

The invention can be modified within the scope of the following claims. I.a. it is possible to supply gas from an independent oxygen source to the gasifier 10 in order to avoid problems with nitrogen contents. The turbine and compressor units can each be comprised of one or more single steps.

Superheated steam from the steam generator 6 can be delivered in optional order to the main receptacle unit, the auxiliary processing receptacle unit 9 and to the gasifier 10. It is thus possible to introduce superheated steam from the steam generator 6 directly to either one of these units and pass gas mix discharged therefrom to any one of the other units. It is also possible to introduce superheated steam from the steam generator 6 directly to each one of these units.

It is important to realize that, in case fuel gas is produced for external use, see FIGS. 5-8 and 10 and the associated text paragraphs, these fuel gases are very hot. It is highly preferred that these fuel gases are subjected to heat recovery and that the recovered heat is brought back into the process—is used in the inventive plant.

For that reason, the conduits 33, 33' and 33" (see FIGS. 5-8 and 10) are lead firstly through heat exchange devices in order to extract heat and secondly through a condenser in order to extract heat and water from these fuel gases. This can be carried out at different pressures as desired. So extracted heat is thereupon advantageously reintroduced into the process by leading heat transfer medium, such as steam, to a heating device for heating one or more of: 1. Compressed air from a compressor unit. 2. Fuel-steam gas mix in the conduit 20 leading to the consumer unit. 3. Water to be introduced into the steam generator for the production of superheated steam. 4. Fuel drying conduit. 5. District heating conduit.

The different devices, measures and method steps can be used either separately or in combination.

The invention claimed is:

1. Method for producing energy including:
producing fuel gases from biomass raw material in a main receptacle unit,
feeding produced fuel gas to a consumer unit for combustion of the fuel gases in the presence of oxygen,
transferring energy from the consumer unit to at least one energy user, characterized by
recovering heat in a flue gas stream downstream of the consumer unit and producing pressurized superheated steam in a steam generator using so recovered heat,
intermittently loading biomass raw material into at least one vessel, being included in the main receptacle unit,
pressurizing the loaded at least one vessel with pressurized superheated steam,
passing pressurized superheated steam through the loaded and pressurized at least one vessel, thereby contacting and heat treating said biomass raw material with the pressurized superheated steam for the production of said fuel gases,
supplying produced fuel gases together with still superheated steam to the consumer unit under essentially maintained pressure, and
intermittently discharging solid biomass residues from the at least one vessel.

2. Method according to claim 1, wherein the main receptacle unit includes a plurality of vessels that are controlled for supplying an equalized stream of fuel gases and steam from the main receptacle unit to the consumer unit.

3. Method according to claim 1, characterized in that said discharged solid biomass residues are supplied to an auxiliary processing receptacle unit where they are gasified in a pressurized environment in the presence of superheated steam.

4. Method according to claim 3, characterized in that the discharged solid biomass residues are disintegrated before they are supplied to an auxiliary processing receptacle unit.

5. Method according to claim 3, characterized in that the solid biomass residues are treated in the auxiliary processing receptacle unit at a treatment temperature range exceeding a treatment temperature range in the main receptacle unit.

6. Method according to claim 3, characterized in that part of fuel gas and steam exiting the main receptacle unit is entered into the auxiliary processing receptacle unit.

7. Method according to claim 1,
characterized in that at least part of solid biomass residues remaining after treatment in the main receptacle unit and at occasions in the auxiliary processing receptacle unit are passed on to a gasifier wherein they are gasified in the presence of superheated steam and an optional supply of oxygen.

8. Method according to claim 1, characterized in that flow of fuel gases to the consumer unit is regulated so as to maintain a continuous equalized supply of fuel gases to the consumer unit.

9. Method according to claim 1, characterized in that pulverized residues remaining after treatment in the main receptacle unit and at occasions in the auxiliary processing receptacle unit and after optional disintegration is entered into the consumer unit together with fuel gas.

10. Method according to claim 1, characterized in that gasification of the fuel is supported by a supply of oxygen.

11. Method according to claim 1, characterized in that the consumer unit is coupled for providing power to a compressor unit and for receiving supply of combustion air from a compressor unit.

12. Method according to claim 1, characterized in that the energy user is an electric generator for the production of electric energy.

13. Method according to claim 1, characterized in that water is recovered in the flue gas stream through a condenser supplying water to the steam generator for the production of superheated steam.

14. Method according to claim 1, characterized in that the fuel gas is led to a consumer unit including a power unit being one from the group including: a turbine arrangement, an internal combustion engine, an internal combustion engine with a turbo charger.

15. Method according to claim 1, characterized in that heat is extracted from discharged solid biomass residues for pre-treatment of solid biomass raw material.

16. Method according to claim 1, characterized in that the flue gas stream from the consumer unit upstream of the steam generator is supplied/supplemented with flue gases from an auxiliary combustor.

17. Method according to claim 1, characterized in that produced fuel gases together with still superheated steam are reheated using heat extracted from the steam generator.

18. Plant for producing energy including:
a main receptacle unit for producing fuel gases from biomass raw material,
means for feeding produced fuel gas to a consumer unit wherein the fuel gases are combusted in the presence of oxygen,
means for transferring energy from the consumer unit to at least one energy user,
characterized by
a steam generator with heat exchange means for recovering heat in a flue gas stream from the consumer unit and arranged to produce pressurized superheated steam using so recovered heat,
a loading arrangement for intermittently loading biomass raw material into at least one vessel, being included in the main receptacle unit,
means for introducing pressurized superheated steam for pressurizing the loaded at least one vessel,
means for passing pressurized superheated steam through the loaded and pressurized at least one vessel for contacting said biomass raw material with the pressurized superheated steam for heat treating the biomass raw material and production of said fuel gases,
supply means for supplying produced fuel gases together with still superheated steam to the consumer unit under essentially maintained pressure, and
discharge means for intermittently discharging solid biomass residues from the at least one vessel.

19. Plant according to claim 18, wherein the main receptacle unit includes a plurality of vessels that are controllable for supplying an equalized stream of fuel gases and steam from the main receptacle unit to the consumer unit.

20. Plant according to claim 18, characterized in that said discharged solid biomass residues supplied to an auxiliary processing receptacle unit wherein they are gasified in a pressurized environment in the presence of superheated steam.

21. Plant according to claim 20, characterized in that a disintegrator device is arranged for disintegrating solid biomass residues discharged from the main receptacle unit before they are supplied to the auxiliary processing receptacle unit.

22. Plant according to claim 18, characterized in that it includes a regulating device for regulating flow of fuel gases so as to maintain a continuous equalized supply of fuel gases to the consumer unit.

23. Plant according to claim 18, characterized in that the consumer unit is coupled for providing power to a compressor unit and for receiving supply of combustion air from a compressor unit.

24. Plant according to claim 18, characterized in that the energy user is an electric generator for the production of electric energy.

25. Plant according to claim 18, characterized in that a condenser is arranged for recovering water to be supplied to the steam generator for the production of superheated steam water in the flue gas stream.

26. Plant according to claim 18, characterized in that the consumer unit includes a power unit being one from the group including: a turbine arrangement, an internal combustion engine, an internal combustion engine with a turbo charger.

27. Plant according to claim 18, characterized by heat exchange means for extracting heat from discharged solid biomass residues for pre-treatment of solid biomass raw material.

28. Plant according to claim 18, characterized in that an auxiliary combustor is arranged downstream of the consumer unit and upstream of the steam generator.

29. Plant according to claim 18, characterized in that a reheater is arranged to extract from the steam generator for heating produced fuel together with superheated steam.

* * * * *